United States Patent Office 3,536,681
Patented Oct. 27, 1970

3,536,681
SUBSTITUTED NORBORNENE COMPOUNDS
Roger E. Morris, Cuyahoga Falls, Ohio, assignor to The B. F. Goodrich Company, New York, N.Y., a corporation of New York
No Drawing. Filed Dec. 13, 1967, Ser. No. 690,082
Int. Cl. C08f 15/20
U.S. Cl. 260—86.1         5 Claims

ABSTRACT OF THE DISCLOSURE 2-hydroxymethyl-5-norbornene is reacted with acid halides and esters of organic acids to form new compositions of matter which are useful in copolymerization with alkyl acrylates to provide cure sites for vulcanization of the polyacrylate in a soap-sulfur system.

BACKGROUND OF THE INVENTION

Specialty elastomers of polymers of alkyl acrylates, particularly those based on alkyl acrylates of 1–10 carbon atoms, have been known for many years. The acrylic elastomers have great resistance to deterioration due to heat. They have good flex strength, ozone resistance and resistance to oil and are recommended for gaskets, hose, wire insulation, coatings and the like. In order to render these saturated polymers susceptible to cure, they have been combined with up to 5 parts by weight or so with a halogen containing monomer. Vinyl chloroacetate, 2-chloroethyl vinyl ether and 2-chloroethyl acrylate have been widely used. The variety of cures and cure systems available to the compounder when dealing with natural rubber has not been available with alkyl acrylate copolymers, even with halogen-containing cure site units included therein. Additional cure site components for acrylate polymers have been sought.

SUMMARY OF THE INVENTION

The compound 2-hydroxymethyl-5-norbornene is known. The material has two reactive sites, the double bond and the hydroxyl group. It has been found that this compound will react through the hydroxyl group with acid halides and esters of organic acids to form esters which are new compositions of matter of the formula

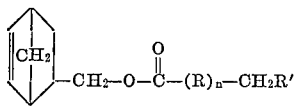

where $n$ is either zero or 1,

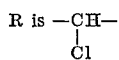

and R' is either hydrogen or halogen, but if $n$ is zero, then R' is halogen. These new monomeric compositions will copolymerize with other monomers including the acrylates, thereby providing cure sites in predominantly polyacrylate materials. These cure sites are amenable to ammonium carboxylate cure and to the soap-sulfur cure system for polyacrylates.

Examples of these new monomers are prepared by reacting 2-hydroxymethyl-5-norbornene with an acid halide or ester of an α-chlorinated or α,β-dichlorinated fatty acid. The acids containing one to ten carbon atoms may be used but α-chlorinated derivatives of acetic, propionic, butyric, and valeric acids are preferred. The acid may be reacted with an alcohol, preferably methanol, ethanol or propanol to form the corresponding ester before reacting with the norbornene compound to form the new compositions of this invention.

DETAILED DESCRIPTION OF THE INVENTION

Example 1.—Preparation of new monomers

A 500-ml. three-necked round bottom flask is fitted with thermometer, reflux condenser, dropping funnel and agitator. The reaction medium, 150 ml. of benzene, and 39.8 g. (0.443 mole) of 2-hydroxymethyl-5-norbornene are added and cooled at 15° C. Next 44.7 g. (0.443 mole) of triethylamine is charged, and then 50 g. (0.443 mole) of chloroacetyl chloride is added dropwise. The reaction mixture is warmed to room temperature and stands for 2 hours. It is filtered to remove solid triethylamine hydrochloride, which is washed with benzene. The benzene solution is washed consecutively with dilute hydrochloric acid, dilute sodium bicarbonate, and distilled water, then dried over anhydrous magnesium sulfate. The benzene is removed by distillation under reduced pressure. Finally the product is fractionally distilled.

The 5-chloroacetoxymethyl-2-norbornene has a boiling point of 69°–72° C. at 0.2 mm. Analysis for chlorine is 17.6 weight percent; theoretical weight percent chlorine is 17.7%. The Nuclear Magnetic Resonance (NMR) spectrum is consistent with the formula set forth above where $n=0$, and R' is Cl.

Example 2.—Chlorination of ethyl acrylate

A 500-ml. three-necked flask is fitted with thermometer, stirrer, cooling trap, cooling bath and sparge type inlet. Ethyl acrylate (200 g.=2.0 mole) and ethyl alcohol (20 g.) are charged. Chlorine (136 g.) is charged through the sparge inlet at 32°–35° C. over a period of 6¼ hours. The reaction product is cooled to room temperature, washed with dilute sodium carbonate (1%), dried over anhydrous magnesium sulfate and distilled under aspirator pressure using an 8″ column packed with copper turnings and redistilled through an 18″ vacuum jacketed column packed with Berl saddles. The ethyl α,β-dichloropropionate has a boiling point of 79°–82.5° C. at 22 mm. compared to 76°–77° at 15 mm. as found in the literature.

Example 3.—Preparation of new monomer

A 500-ml., three-necked flask is fitted with stirrer, thermometer, an 8″ column packed with copper turnings and a liquid dividing head, and a heating mantle.

Ethyl α,β-dichloropropionate from Example 2 (84 g.= 0.5 mole), 2-hydroxymethyl-5-norbornene (124 g.=1.0 mole) and tetra-n-butyl titanate (3 g.), are charged and heated to 100° C., reacted for 2 hours, after which a slight vacuum is applied until 20 milliliters of distillate is obtained. The reaction mass is diluted with 300 ml. of benzene and washed consecutively with dilute hydrochloric acid, dilute sodium bicarbonate and distilled water. The washed material is dried over anhydrous magnesium sulfate and benzene is removed under reduced pressure. Next the material is fractionally distilled.

The 2-norbornenyl-5-methyl 2,3-dichloropropionate has a boiling point of 87°–94° C. at 0.2–0.4 mm.

Example 4.—Preparation of acrylate copolymer

A three-necked glass flask fitted with stirrer, reflux condenser, thermometer, dropping funnel and heating mantle is purged with nitrogen. Boiled water, emulsifier and catalyst are added to the flask, stirred and heated to 40° C. About 10% of the monomers is charge initially and the balance is added dropwise as reaction proceeds. Total parts monomers charged is 100. The temperature is maintained at 40° C. until one hour after the last reactants are charged. The reaction is conducted throughout under a nitrogen atmosphere. The latex which forms is coagulated with a 2% calcium chloride solution, washed three times with distilled water and dried.

What is claimed is:
1. A soap-sulfur vulcanizable synthetic elastomer comprising a free radical catalyzed copolymer containing 94.5–99 weight percent of alkyl acrylate and 1–5.5 weight percent of a comonomer of the formula:

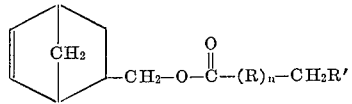

TABLE 1

| Material | Parts by weight | | | | | | |
|---|---|---|---|---|---|---|---|
| | A | B | C | D | E | F | G |
| Ethyl acrylate | 98 | 97 | 96 | 94.5 | 96.5 | 95 | 94.5 |
| 5-chloroacetoxymethyl-2-norbornene | 2 | 3 | 4 | 5.5 | | | |
| 5-(α,β-dichloropropoxymethyl)-2-norbornene | | | | | 3.5 | 5.0 | 5.5 |
| Water | 250 | 250 | 250 | 250 | 250 | 250 | 250 |
| Sodium alkyl benzene sulfonate (10%) | 42 | 42 | 42 | 42 | 42 | 42 | 42 |
| Potassium persulfate (2%) | 20 | 20 | 20 | 20 | 20 | 20 | 20 |
| Sodium meta bisulfite (2%) | 10 | 10 | 10 | 10 | 10 | 10 | 10 |

The alkyl acrylate copolymers containing added cure sites as prepared under the designation A through G are submitted to vulcanization in the soap-sulfur cure system (A–E) and ammonium benzoate cure system (F, G) as set forth in Table 2. For each test 100 parts of the curable polymer is banded on a rubber mill at room temperature. The curing ingredients are milled in over a period of approximately 20 minutes. Samples are cured 5 minutes at 340° F. Tensile and elongation are evaluated after ASTM procedure D412. Hardness results are obtained on cured samples by ASTM procedure D676. Compression set is run according to ASTM procedure D395(B) for 22 hours at 300° F. with plied samples. Oil aging is run for 3 days at 300° F. after ASTM D471. Air aging is conducted at 350° F. for 3 days.

where $n$ is either zero or 1,

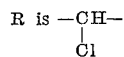

and R′ is either hydrogen or chlorine and if $n$ is zero, then R′ is chlorine.

2. A soap-sulfur vulcanizable synthetic elastomer according to claim 1 wherein $n$ is zero, and R′ is chlorine.
3. A soap-sulfur vulcanizable synthetic elastomer according to claim 1 wherein $n$ is one, and R′ is chlorine.
4. A vulcanized elastomer according to claim 2.
5. A vulcanized elastomer according to claim 3.

TABLE 2

| Material | Parts by weight | | | | | | |
|---|---|---|---|---|---|---|---|
| | A | B | C | D | E | F | G |
| Copolymer | 100 | 100 | 100 | 100 | 100 | 100 | 100 |
| Stearic acid | | | | | | 1 | 1 |
| Carbon black | 65 | 65 | 65 | 50 | 50 | 50 | 50 |
| Potassium stearate | 3.0 | 3.0 | 3.0 | 3.0 | | | |
| Sodium stearate | 1.0 | 1.0 | 1.0 | 1.0 | | | |
| Sulfur | 0.4 | 0.4 | 0.4 | 0.4 | | | |
| Ammonium benzoate | | | | | 4.0 | 4.0 | 4.0 |
| Phenylbetanaphthamine | | | | | 2.0 | 2.0 | 2.0 |
| Tensile strength, p.s.i. | 1,900 | 1,820 | 1,720 | 1,490 | 1,130 | 1,120 | 720 |
| Elongation, percent | 275 | 290 | 225 | 390 | 615 | 530 | 590 |
| Hardness | 60 | 60 | 65 | 50 | 45 | 45 | 39 |
| Oil aging: | | | | | | | |
| Tensile | 1,630 | 1,550 | 1,500 | 1,200 | | | |
| Elongation | 190 | 170 | 150 | 195 | | | |
| Air aging: | | | | | | | |
| Tensile | 1,320 | 1,170 | 1,120 | 1,000 | 1,950 | 2,130 | 1,850 |
| Elongation | 195 | 180 | 150 | 285 | 175 | 130 | 105 |
| Compression set, percent | 38.2 | 41.4 | 42.5 | 35.2 | | | |

References Cited

UNITED STATES PATENTS

| | | | |
|---|---|---|---|
| 2,838,479 | 6/1958 | Biletch | 260—86.1 |
| 2,985,611 | 5/1961 | Gaylord et al. | 260—86.1 |
| 3,022,277 | 2/1962 | Nelson | 260—89.5 |
| 3,058,965 | 10/1962 | Gaylord | 260—86.1 |
| 3,215,659 | 11/1965 | Spaulding | 260—86.1 |
| 3,255,162 | 6/1966 | Beavers et al. | 260—86.1 |
| 3,312,675 | 4/1967 | Caldwell et al. | 260—86.1 |
| 3,336,275 | 8/1967 | Michelotti | 260—89.5 |

HARRY WONG, JR., Primary Examiner

U.S. Cl. X.R.

260—29.6, 41, 79.5, 89.1, 478